US007986519B2

(12) United States Patent
Masuda

(10) Patent No.: US 7,986,519 B2
(45) **Date of Patent: *Jul. 26, 2011**

(54) STORAGE UNIT HOLDING MECHANISM AND IMAGE FORMING APPARATUS HAVING THE HOLDING MECHANISM

(75) Inventor: Sadahiro Masuda, Mishima (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/765,012

(22) Filed: Apr. 22, 2010

(65) Prior Publication Data

US 2010/0200725 A1 Aug. 12, 2010

Related U.S. Application Data

(63) Continuation of application No. 11/479,281, filed on Jun. 30, 2006, now Pat. No. 7,734,214.

(30) Foreign Application Priority Data

Jun. 30, 2005 (JP) ................................ 2005-191966

(51) Int. Cl.
*G06F 1/16* (2006.01)

(52) U.S. Cl. .............. 361/679.36; 361/679.34; 361/724; 312/223.1; 312/265.1; 399/109

(58) Field of Classification Search ............. 361/679.34, 361/679.36, 679.37; 399/107
See application file for complete search history.

(56) References Cited

U.S. PATENT DOCUMENTS

| | | | |
|---|---|---|---|
| 5,995,364 A | 11/1999 | McAnally et al. | |
| 6,164,614 A | 12/2000 | Lim et al. | |
| 6,249,504 B1 | 6/2001 | Iwanaga | |
| 6,462,940 B1 * | 10/2002 | Diaz et al. | 361/679.37 |
| 6,781,827 B2 | 8/2004 | Goodman et al. | |
| 6,781,841 B2 | 8/2004 | Kim et al. | |
| 7,734,214 B2 * | 6/2010 | Masuda | 399/107 |
| 2005/0088778 A1 | 4/2005 | Chen et al. | |
| 2007/0151936 A1 | 7/2007 | Huang | |

FOREIGN PATENT DOCUMENTS

| | | |
|---|---|---|
| JP | 04-212877 | 8/1992 |
| JP | 2002-281197 | 9/2002 |

OTHER PUBLICATIONS

Office Action for U.S. Appl. No. 11/479,281 mailed on Mar. 19, 2008.
Office Action for U.S. Appl. No. 11/479,281 mailed on Nov. 14, 2008.
Office Action for U.S. Appl. No. 11/479,281 mailed on Jun. 25, 2009.

* cited by examiner

*Primary Examiner* — Jayprakash N Gandhi
*Assistant Examiner* — Anthony Q Edwards
(74) *Attorney, Agent, or Firm* — Turocy & Watson, LLP

(57) ABSTRACT

A system board provided with electrical components is contained in a substrate frame, a reinforcing frame is pivotally fixed to an peripheral part of the substrate frame, and an HDD is mounted on the reinforcing frame in a vibration-damping manner. With this structure, the HDD is mounted on the system board in a floating state, and a space is formed between them as an airflow passage.

8 Claims, 5 Drawing Sheets

STORAGE UNIT HOLDING MECHANISM AND IMAGE FORMING APPARATUS HAVING THE HOLDING MECHANISM

CROSS-REFERENCE TO RELATED APPLICATIONS

This application is a Continuation of application Ser. No. 11/479,281 filed Jun. 30, 2006, the entire contents of which are hereby incorporated by reference.

This application is based upon and claims the benefit of priority from prior Japanese Patent Application No. 2005-191966 filed Jun. 30, 2005, the entire contents of which are hereby incorporated by reference.

BACKGROUND OF THE INVENTION

The present invention relates to a holding mechanism for holding a storage unit such as a hard disc drive (HDD), and an image forming apparatus such as a copier and printer having the holding mechanism.

As a conventional HDD holding mechanism, it is known to mount an HDD on an extended option board to facilitate mounting and removing a HDD on/from a laser printer (refer to Jpn. Pat. KOKAI Publication No. 4-212877). In this configuration, an HDD is mounted on an extended option board in a vibration-damping manner by fastening an upper structure provided with an HDD to a lower structure fixed to a frame of an extended option board through an elastic member. This facilitates mounting and removing an HDD on/from a main body of printer, and prevents transmission of vibration and shock to an HDD when mounting and dismounting an extended option board.

However, the elastic member is provided simply for elastically fastening the upper structure with HDD to the lower structure rigidly fixed to the frame, not for absorbing a shock applied externally to a printer in a specific direction. Namely, a shock externally applied to a printer includes a relatively large impact applied in a paper cassette drawing direction. A desirable damping structure absorbs effectively such a shock applied in a specific direction. An HDD is sensitive to external shock, and becomes unusable in the worst case if exposed to external shock. Improvement of the HDD is desired.

It is also known that when an HDD is accessed at a high speed, the load is increased and the HDD heats up. However, it is difficult to radiate the heat of an HDD in the above-mentioned conventional structure. In the above structure that an extended option board with HDD is inserted and placed in a printer housing, there is almost no space around the HDD for the heat to escape, and almost no radiation effect is expected. Particular in the above conventional structure, a control board provided with electrical components including a CPU heated to a relatively high temperature is placed close to an extended option board provided with an HDD, the heat from the electrical components is easily transmitted to the HDD, and the heat radiation is disturbed. A hot HDD decreases the reliability of operation.

BRIEF SUMMARY OF THE INVENTION

It is an object of the present invention to provide a storage unit holding mechanism, which increases heat radiation effect, shock-absorbing capability and operation reliability of a storage unit, with a low-price structure, and an image forming apparatus having the holding mechanism.

In order to achieve the above object, according to an embodiment of the invention, there is provided a storage unit holding mechanism which has a reinforcing frame fixed pivotally to a substrate frame with a substrate provided with electrical components, and a fixing member to fix a storage unit to the reinforcing frame, in order to hold the storage unit in a floating state to the substrate.

According to another embodiment of the invention, there is provided an image forming apparatus having a paper supply cassette which is mounted removably in a first direction to the main body of the apparatus, an image forming unit which forms an image on a paper sheet supplied from the paper supply cassette, a substrate frame which fixes a substrate provided with electrical components in the main body of the apparatus, a holding mechanism which holds a storage unit in a floating state to the substrate fixed to the substrate frame, and a cover which covers the storage unit held by the holding mechanism, wherein the holding mechanism has a reinforcing frame fixed pivotally to the substrate frame, and a fixing member to fix the storage unit to the reinforcing frame.

According to still another embodiment of the invention, there is provided an image forming apparatus having an image forming unit which forms an image on a paper sheet, a substrate frame which fixes a substrate provided with electrical components, a holding mechanism which holds a storage unit in a floating state to the substrate fixed to the substrate frame, and a cover which covers the storage unit held by the holding mechanism, wherein the holding mechanism has a reinforcing frame fixed pivotally to the substrate frame, and a fixing member to fix the storage unit to the reinforcing frame.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Embodiments of the invention will be explained in detail hereinafter with reference to the accompanying drawings.

Figure 1:
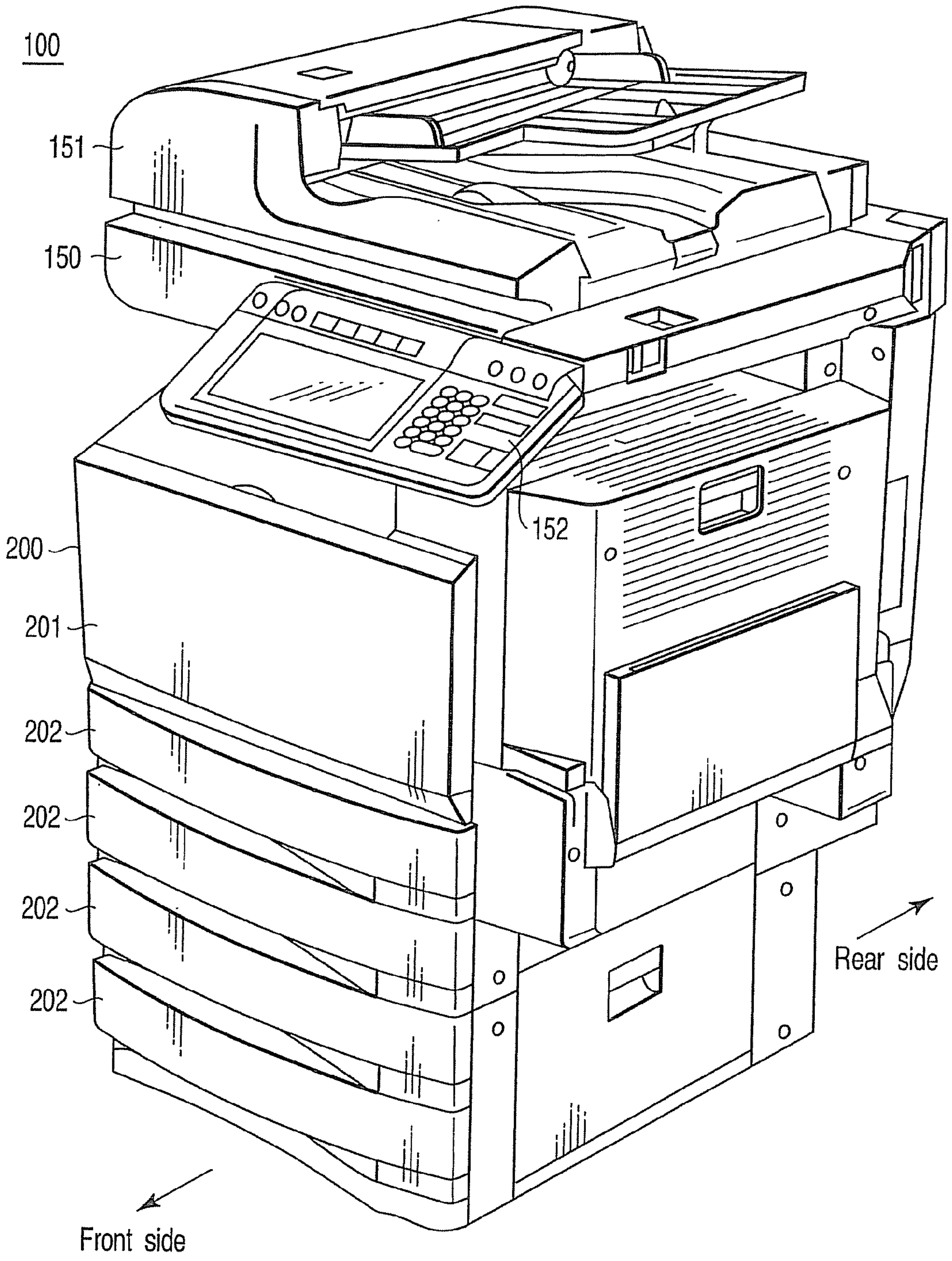
FIG. 1 is a schematic perspective view showing a digital copier according to an embodiment of the invention.

FIG. 1 shows a schematic perspective view of a digital copier 100 (hereinafter called a copier 100) as in image forming apparatus according to an embodiment of the invention.

The copier 100 has a scanner 150 which reads an image of a document and outputs an image signal, and an image forming unit 200 which forms an image on a paper sheet based on the image signal output from the scanner 150 or an externally applied image signal.

The scanner 150 has in the upper part an automatic document feeder 151 (an ADF 151) which automatically feeds a document to an image reading position. When the ADF 151 is raised, a document table glass 155 (refer to FIG. 3) provided at the top of the scanner 150 is exposed. In the front side of the scanner 150, a control panel 152 to operate the copier 100 is provided.

In the front side of the image forming unit 200, an openable front cover 201 is provided to expose the interior of the main body of the apparatus as needed. In the front side and under the image forming unit 200, a multi-stage paper supply cassette 202 is removably provided. In the Claims, the paper supply cassette 202 inserting/removing direction with respect to the main body, that is, the back-and-forth direction, is defined as a first direction, and the ADF 151 opening/closing direction, that is, the vertical direction, is defined as a second direction.

Figure 2:
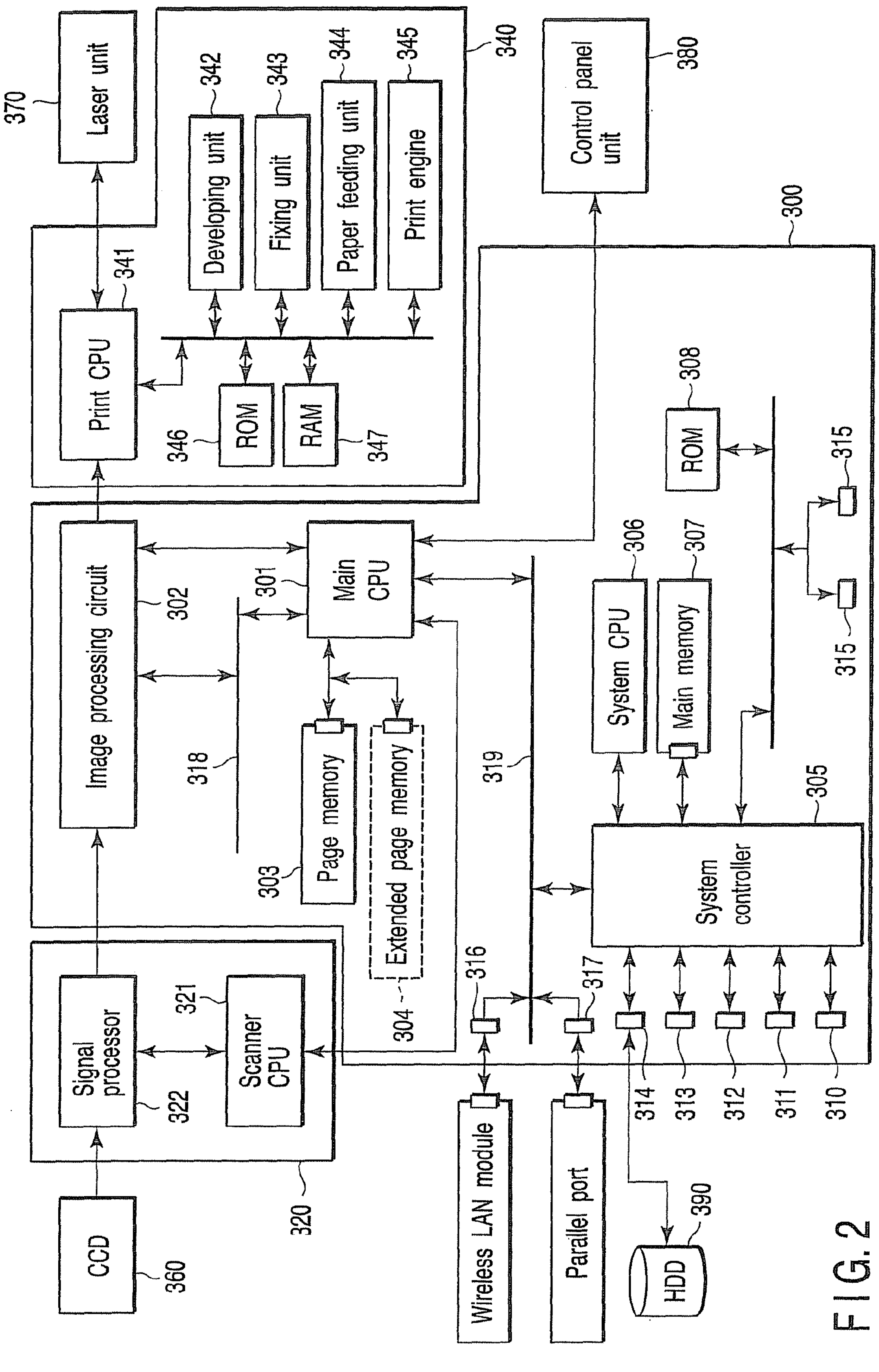
FIG. 2 is a block diagram of a control system to control the operation of the copier of FIG. 1.

FIG. 2 shows a block diagram of a control system to control the operation of the copier 100 shown in FIG. 1.

The copier 100 has a system board 300 (substrate) provided with electrical components, a scanner control board 320, an engine control board 340, a charge coupled element 360 (CCD), a laser unit 370, a control panel unit 380, and a hard disc drive 390 (HDD) as a recorder of the invention.

The system board 300 has electrical components, such as a main CPU 301, an image processing circuit 302, a page memory 303, an extended page memory connector 304, a system controller 305, a system CPU 306, a main memory 307, a ROM 308, a LAN connector 310, a FAX connector 311, a Bluetooth (registered trademark, omitted hereinafter) connector 312, a USB connector 313, an HDD connector 314, a ROM rewriting external connector 315, a wireless LAN module connector 316, and a parallel port connector 317.

The scanner control board 320 is controlled by a scanner CPU 321 which totally controls the scanner 150, and a signal processor 322 which converts an image signal controlled by the scanner CPU 321 and supplied from the CCD 360 to a processable signal in the image processing circuit 302.

The engine control board 340 has a print CPU 341, a developing unit 342, a fixing unit 343, a paper feeding unit 344, a print engine 345, a ROM 346, and a RAM 347.

The main CPU 301 totally controls the scanner CPU 321, control panel unit 380 and image processing circuit 302, and is connected to the page memory 303. The main CPU 301 is connected to a connector for the extended page memory 304, and can add an extended page memory as needed.

Further, the main CPU 301 is connected to the image processing circuit 302 through a data bus 318, and connected to the system controller 305, wireless LAN module connector 316 and parallel port connector 317 through a bus 319.

The image processing circuit 302 processes an image signal output from the signal processor 322, and outputs it to the print CPU 341.

The system controller 305 is connected to the system CPU 306, main memory 307, LAN connector 310, FAX connector 311, Bluetooth connector 312, USB connector 313 and HDD connector 314. The system controller 305 is connected also to the ROM 308 and ROM rewriting external connector 315 through a bus.

The LAN connector 310 is connected to external devices through a local area network (LAN), and performs data transmission with external devices.

The FAX connector 311 is connected to a telephone line, and receives facsimile image data transmitted through a telephone line.

The Bluetooth connector 312 is connected to a device capable of transmitting wireless data, and transmits wireless data.

The USB connector 313 is connected to a personal computer or other electronic equipment through a cable having a USB terminal, and performs data transmission/reception.

The HDD connector 314 is connected with the HDD 390 through a harness.

The print CPU 341 is connected to the developing unit 342, fixing unit 343, paper feeding unit 344, print engine 345, ROM 346, and RAM 347.

The developing unit 342 comprises a photoconductor drum and a developing device. The fixing unit 343 consists of a fixing device.

The paper feeding unit 344 feeds a paper sheet supplied from the paper supply cassette 202 through the developing unit 342 and fixing unit 343. The paper feeding unit comprises a paper feeding mechanism to feed and eject an image-formed paper sheet, and a driving circuit for it.

The print CPU 341 receives an image signal output from the image processing circuit 302, and outputs it to the laser unit 370.

Now, the HDD 390 holding mechanism will be explained with reference to FIG. 3 to FIG. 7.

Figure 3:
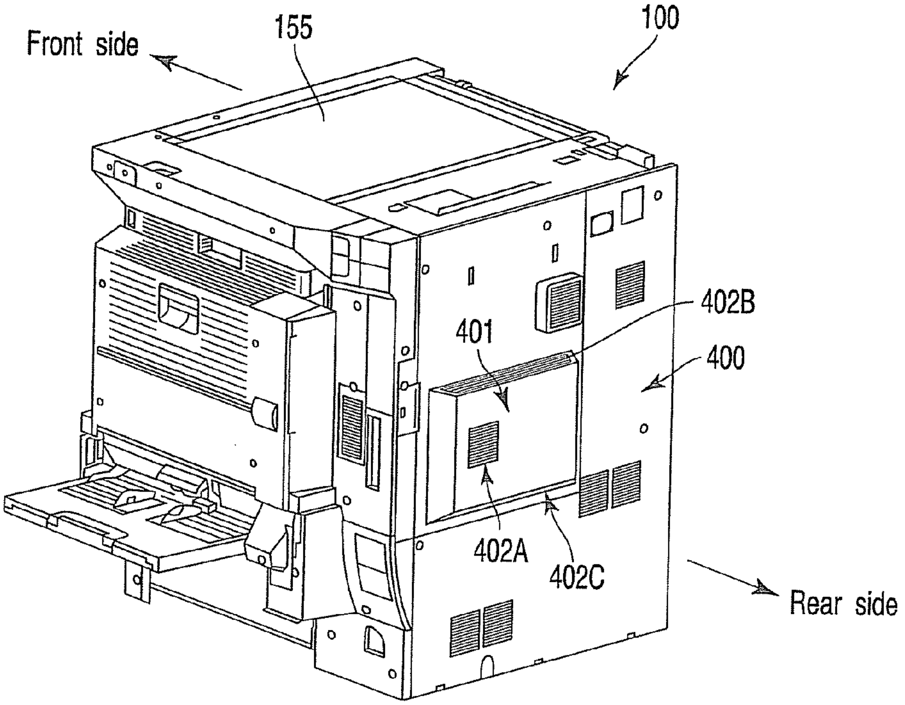
FIG. 3 is a schematic perspective viewed from the rear side of the copier of FIG. 1.
Figure 4:
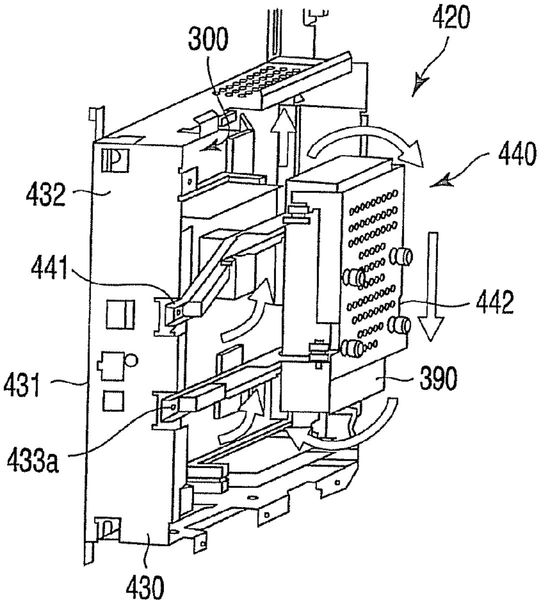
FIG. 4 is a schematic perspective view showing a HDD holding mechanism housed in the rear side of the copier of FIG. 1.
Figure 5:
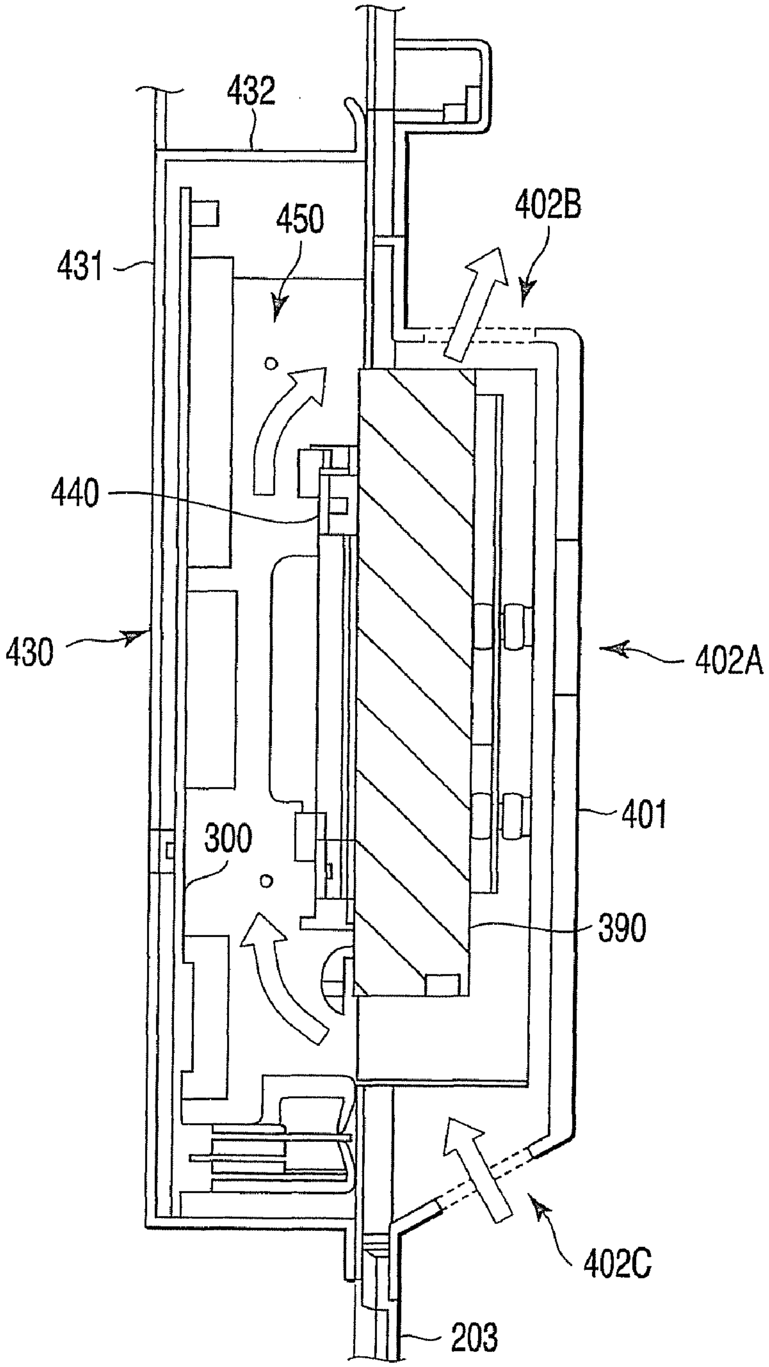
FIG. 5 is a sectional view of the holding mechanism of FIG. 4.
Figure 6:
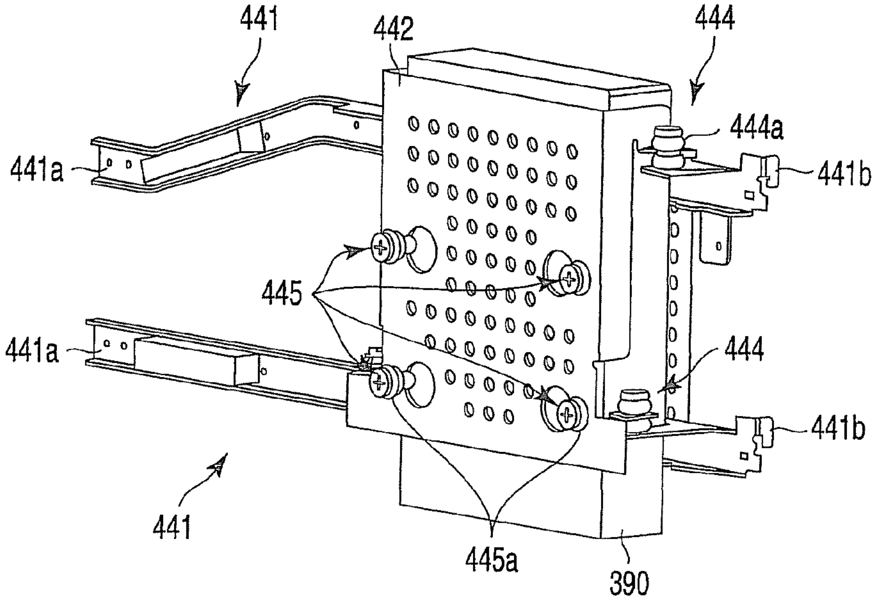
FIG. 6 is a schematic perspective view showing the HDD fixed to the reinforcing frame of the holding mechanism of FIG. 4.
Figure 7:
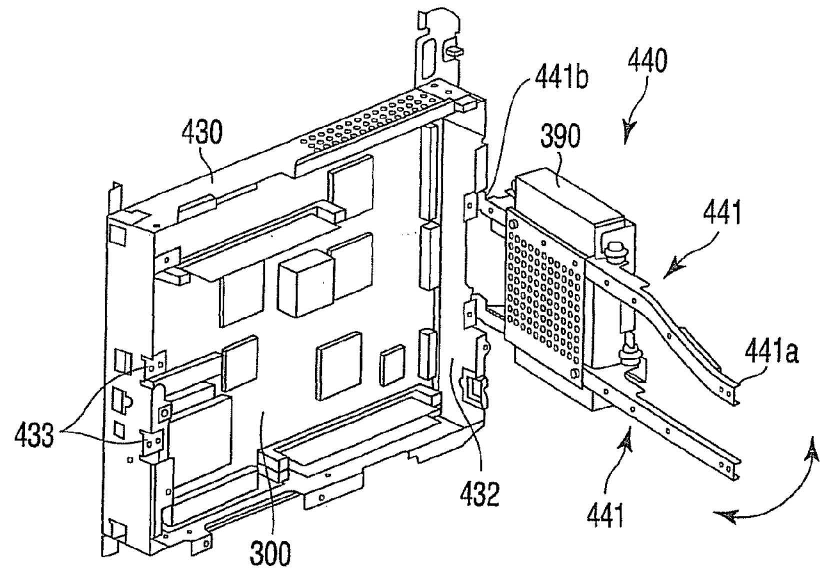
FIG. 7 is a schematic perspective view showing the opened state of the reinforcing frame of the holding mechanism of FIG. 4.

FIG. 3 is a schematic perspective view of the structure of the copier 100 of FIG. 1 with the ADF 151 removed, viewed from the rear side. FIG. 4 is a schematic perspective view of a holding mechanism according to an embodiment of the invention. FIG. 5 is a partially magnified sectional view of a peripheral structure of the holding mechanism shown in FIG. 4. FIG. 6 is a schematic perspective view showing a reinforcing frame of the holding mechanism of FIG. 4, and a fixing member to fix the HDD 390 to the reinforcing frame. FIG. 7 is a schematic perspective view showing the state of the holding mechanism of FIG. 4 with the reinforcing frame opened.

As shown in FIG. 3, the copier 100 has in the rear side a board housing 400 to contain the system board 300 (substrate) and HDD 390 (storage unit) shown in FIG. 2. The board housing 400 contains the holding mechanism 420 shown in FIG. 4. The holding mechanism 420 is covered by a rear cover 401 (cover) projecting to the outside of the apparatus.

As shown in FIG. 3 and FIG. 5, the rear cover 401 has a venthole 402A provided on the side substantially parallel to the rear side of the apparatus main body, a vent 402B provided in the upper part of the rear cover 401, and a vent 402C provided in the lower part of the rear cover 401 connecting the rear and side of the apparatus main body. The heat in the copier 100 is efficiently exhausted through these vent 402A-402C.

Namely, the heated air rises, and the air flowing in the rear cover 401 through the vent 402C in the lower part (and the vent 402A) is exhausted to the outside of the apparatus body through the vent 402B in the upper part through the clearance between a system board 300 and HDD 390. In this time, by mounting the HDD 390 in a state floating from the system board 300 as described later, a relatively large clearance is formed therebetween to ensure an airflow passage for radiating the heat.

As shown in FIG. 4, the holding mechanism 420 has a substrate frame 430 to fix the system board 300, and a reinforcing frame 440 fixed pivotally to the substrate frame 430. The HDD 390 is mounted on the reinforcing frame 440 in a vibration-damping manner. The HDD 390 is arranged at a holding position closest to the system board 300, in the state that the reinforcing frame 440 is rotated to the position shown in FIG. 4.

As shown in FIG. 5, the substrate frame 430 is recessed inside a main body cover 203 covering the copier 100, and contains the system board 300 in the main body of the copier 100. Namely, the substrate frame 430 functions as a cabinet to contain the system board 300, and the system board 300 is fixed to the bottom 431. In other words, a peripheral part 431 of the substrate frame 430 is raised 90° against the bottom 431, and the bottom 431 fixed with the system board 300 is arranged deeply inside the main body cover 203 of the copier 100. A sufficient clearance is ensured between the HDD 390 and rear cover 401 to prevent shock transmitting directly to the HDD 390 even if a shock is applied from the direction of the rear cover 401.

The reinforcing frame 440 has two bar-shaped members 441 fixed pivotally to the peripheral part 432 extending in the vertical direction of the substrate frame 430. The HDD 390 is held between the two bar-shaped members 441 and a holding plate 442, and fixed to the reinforcing frame 440 in this state. In this state, the HDD 390 is fixed to the side of the reinforcing frame 440 remote from the system board 300, or the side close to the rear cover 401, to ensure more space between the system board 300 and HDD 390.

Therefore, a relative large space 450 is formed between the HDD 390 and system board 300, and an airflow passage is formed by natural convection of heat from lower to higher place. The heated air flowing in this space 450 is positively exhausted to the outside through the vent 402A-402C (especially, the vent 402B) provided in the rear cover 401.

With the above configuration, the heat caused by rapid access to the HDD 390 or generated from the electrical components such as CPU mounted on the system board 300 is efficiently exhausted to the outside. Therefore, the cooling capacity of the system board 300 and HDD 390 is increased, the HDD 390 is prevented from being damaged by the heat generated in the copier 100, and the operation reliability is ensured. Further, by using the above-mentioned structure, a cooling mechanism such as a fan is unnecessary, and the cost is decreased.

In particular, as in the embodiment, by providing the HDD 390 in the rear side of the copier 100 and at a position close to the main body cover 203, outside air is easily taken into the rear cover 401, and the cooling efficiency of the HDD 390 is increased furthermore.

Further, by mounting the HDD 390 in the state floating from the system board 300 by fixing it to the reinforcing frame 440, as described above, the HDD 390 can be isolated from the system board 300 by the distance equivalent to the space 450. Therefore, the HDD 390 is prevented from being directly exposed to heat, even if a high-temperature heat is generated from the electrical components mounted on the system board 300.

As in the embodiment, the system board 300 and HDD 390 are arranged so that the sides having the maximum area are opposed (side-faced form). Therefore, the system board 300 and HDD 390 are arranged so that the sides having the maximum area are opposed (side-faced form). Therefore, the system board 300 and HDD 390 can be housed compactly, the size of the apparatus can be reduced, and the space 450 can be sufficiently provided. Sufficient airflow can be ensured by the natural convention of heat inside the apparatus.

In contrast, in the apparatus disclosed in the Jpn. Pat. Applin. KOKAI Publication 4-212877 referred to before, the system board and HDD are arranged nearby without providing a space like the space 450 in the above-mentioned embodiment, and the HDD is heated by the heat generated from the system board to a temperature higher than a value to ensure normal operation, and the reliability of HDD may be lost. By providing a sufficient space 450 between the HDD 390 and system board 300 as in the embodiment, the HDD 390 is given a sufficient cooling effect, and the reliability of operation is increased.

When the system board 300 is extended in the vertical direction as in the embodiment, the components generating a relatively high temperature among the electrical components mounted on the system board 300 (e.g., the main CPU 301, scanner CPU 321 and print CPU 341) are preferably arranged in the upper part of the system board 300. The electrical components mounted on the system board 300 are preferably arranged, so that larger components disturb the flow of natural convection in the space 450.

Now, explanation will be given on the damping structure of the holding mechanism 420 with reference to FIG. 6 and FIG. 7.

As shown in FIG. 6 and FIG. 7, each of the two bar-shaped members 441 of the reinforcing frame 440 has a connection structure to be fixed pivotally to the substrate frame 430 at one end 441*a*, and an engagement structure to removably engage with an fitting notch 433 (refer to FIG. 7) of the peripheral part 432 of the substrate frame 430 at the other end 441*b*. Therefore, when arranging the HDD 390 at the holding position, close the reinforcing frame 440 with the HDD 390 to the state shown in FIG. 4, fit the end 441*a* of the bar-shaped member 441 in the fitting notch 433 of the substrate frame 430, and fix with a screw 433*a*.

The rear side of the HDD 390 is fixed to the holding plate 442 in a vibration-damping manner. By connecting the holding plate 442 to the two bar-shaped members 441 in a vibration-damping manner through connection members 444, the HDD 390 is held between the holding plate 442 and bar-shaped members 441, and fixed to the reinforcing frame 440 in a vibration-damping manner.

Each of the bar-shaped members 441 and holding plate 442 has a plate piece extending substantially in the horizontal direction, and is connected by the connection member 444 by adjusting the screw hole formed in the plate piece. The connection member 444 has a screw to be vertically inserted in the screw holes formed in the bar-shaped member 441 and holding plate 442 for connecting these members, and an antivibration member 444*a* such as an antivibration rubber to absorb vibration. Namely, the bar-shaped member 441 and holding plate 442 are connected in a vibration-damping manner in the vertical direction by the action of the connection members 444.

The HDD 390 placed between the two bar-shaped members 441 and holding plate 442 is fixed to the holding plate 442 by using the connection members 445. The connection members 445 have a screw and antivibration member 445*a* extending substantially in the horizontal direction, like the above-mentioned connection member 444 extending in the vertical direction. Namely, the HDD 390 is connected to the holding plate 442 with a screw, in the state that the antivibration member 445*a* is inserted in the space to at least one of the holding plate 442 and HDD 390. Therefore, the HDD 390 and holding plate 442 are connected in a vibration-damping manner in the horizontal direction.

In this embodiment, the damping direction by the antivibration member 445*a* (first antivibration member) of the connection member 445 connecting the HDD 390 and holding plate 442 in the horizontal direction is substantially identical to the paper supply cassette 202 inserting/removing direction (first direction), and the damping direction by the antivibration member 444*a* (second antivibration member) of the connection member 444 connecting the bar-shaped member 441 and holding plate 442 in the vertical direction is substantially identical to the ADF 151 opening/closing direction (second direction). Therefore, a relatively large shock (shock generated when inserting/removing the paper supply cassette and shock generated when opening/closing the ADF) among the external shocks applied to the copier 100 is effectively absorbed, and the HDD 390 is protected against the shock.

The reinforcing frame 420 fixed with the HDD 390 can be rotated in the horizontal direction as shown in FIG. 7 by releasing the fixing by removing the screw 433*a* fastening the end 441*a* of the bar-shaped member 441, and the system board 300 can be easily exposed. As above described, according to the embodiment, the HDD 390 can be easily isolated from the system board 300, and the system board 300 can be accessed without removing the HDD 390 completely from the apparatus, improving the convenience. Particularly, as in the embodiment, by adopting the structure to expose the system board 300 without removing the HDD 390 from the reinforcing frame 420, it is unnecessary to put the HDD 390 once on a workbench when accessing the system board 300, and undesired vibration to the HDD 390 can be avoided.

As described above, by adopting the holding mechanism 420 according to the embodiment, the HDD 390 is held by two bar-shaped members 441, and the vibration/shock generated when inserting/removing the paper supply cassette 202, opening/closing the automatic document feeder 151, or carrying the copier 100 is difficult to be transmitted to the HDD 390. Besides, since the bar-shaped member 441 and holding plate 442 are connected by the connection member 444 having the antivibration member 444*a*, and the holding plate and HDD 390 are connected by the connection member 445 having the antivibration member 445*a*, the HDD 390 is floated to isolate vibration, and the vibration from the reinforcing frame 440 is more difficult to transmit.

Therefore, the antivibration of the reinforcing frame 440 is improved, and problems caused by vibration to the HDD 390 can be avoided.

In contrast, if the HDD 390 is mounted on the substrate frame 430 through sheet metal, for example, the sheet metal itself is easy to transmit vibration, and vibration is transmitted to the HDD 390 even if an antivibration member is used in a fixing member. When the paper cassette 202 is pressed by a strong force or the automatic document feeder 151 is closed, the HDD 390 may be damaged by the vibration.

By adopting the holding mechanism 420, the HDD 390 is held by the reinforcing frame 440 through the connection member 445, while being held by the bar-shaped member 441 and holding plate 442. Therefore, the HDD 390 can be easily removed from the reinforcing frame 440 by removing the connection member 445 and shifting the HDD 390 in the vertical direction (e.g., downward). This improves the operability when removing the HDD 390 for replacement or inspection.

Further, by adopting the holding mechanism 420, the reinforcing frame 440 fixing the HDD 390 can be easily rotated in the horizontal direction by releasing the fixing of the substrate frame 430 to the end 441*a* of the bar-shaped member 441. This improves the operability when the electrical components mounted on the system board 300 are replaced, repaired and inspected, or when an extended page memory mounted additionally as an option is connected to the connector 304.

In addition, the operability is improved by the easy access to the LAN connector 310, FAX connector 311, Bluetooth connector 312, USB connector 313, HDD connector 314, ROM rewriting external connector 315, wireless LAN module connector 316, and parallel port connector 317.

Further, by adopting the holding mechanism 420, the HDD 390 can be temporarily retracted without removal from the reinforcing frame 440 when exposing the system board 300. This prevents removal and accidental dropping of the HDD 390, and protects against damage caused by an unnecessary shock when the HDD 390 is retracted to expose the system board 300.

Since the HDD is mounted on the substrate frame 430 through two slender bar-shaped members 441, the HDD 390 can be operated without moving by placing in an operable position and providing a connector as described above. Namely, the system board 300 can be easily accessed through the clearance in the reinforcing frame 440, and the connector can be easily connected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, the system board 300 is not limited to the configuration explained in FIG. 2, and it may be configured to have electrical components.

Application of the holding mechanism 420 according to the embodiment of the invention is not limited to a copier. It may be applied to various other apparatus using an HDD, such as a personal computer.

The reinforcing frame 440 is pivotally fixed to the substrate frame 430 in the description of the embodiment, but the invention is not limited to this structure. For example, the reinforcing frame may be pivotally fixed to the main body frame 203 of the copier 100.

What is claimed is:

1. A storage holder, comprising:
- a substrate frame to support a substrate;
- a first beam bridged across the substrate frame over the substrate;
- a second beam bridged across the substrate frame over the substrate and separately formed from the first beam;
- a holding plate screwed on a storage unit and supported by the first beam and the second beam;
- a first antivibration member inserted between the holding plate and the first beam to absorb vibration;
- a second antivibration member inserted between the holding plate and the second beam to absorb vibration; and
- a third antivibration member inserted between the holding plate and the storage unit to absorb vibration.

2. The storage holder of claim 1, wherein one end of the first beam is held rotably with respect to the substrate frame and the other end is screwed on.

3. The storage holder of claim 1, wherein one end of the first beam is held rotably in a direction from the substrate.

4. The storage holder of claim 3, wherein one end of the second beam is held rotably in a direction distant from the substrate.

5. The storage holder of claim 1, further comprising:

a first screw to connect the first beam and the holding plate, the first screw is screwed in a longitudinal direction relative to the storage unit; and a second screw to connect the holding plate and the storage unit, the second screw is screwed in a direction perpendicular to the longitudinal direction relative to the storage unit.

6. The storage holder of claim 5, wherein the first screw penetrates the first antivibration member.

7. The storage holder of claim 6, wherein the second screw penetrates the second antivibration member.

8. The storage holder of claim 1, wherein a damping direction of the first and the second antivibration members is different from a damping direction of the third antivibration member.

* * * * *